United States Patent [19]

Williams et al.

[11] 4,351,549

[45] Sep. 28, 1982

[54] MANDREL CLAMP ASSEMBLY

[75] Inventors: Frank E. Williams; Alfred D. Story, both of Danville, Ill.

[73] Assignee: Teepak, Inc., Chicago, Ill.

[21] Appl. No.: 147,773

[22] Filed: May 8, 1980

[51] Int. Cl.³ .............................................. F16L 41/00
[52] U.S. Cl. ........................................ 285/27; 285/39; 285/197; 285/379; 403/14; 403/15
[58] Field of Search ................ 285/197, 198, 199, 27, 285/379, 18, 404, 39; 277/9, 9.5, 10; 403/14, 13, 15, 19

[56] References Cited

U.S. PATENT DOCUMENTS

| | | | |
|---|---|---|---|
| 583,926 | 6/1897 | McRoy | 285/137 R X |
| 802,462 | 10/1905 | Martin | 285/379 |
| 2,839,075 | 6/1958 | Mueller | 285/197 X |
| 3,844,590 | 10/1974 | Burton | 285/197 |
| 3,918,748 | 11/1975 | Acda | 285/197 X |

FOREIGN PATENT DOCUMENTS

| | | | |
|---|---|---|---|
| 636659 | 1/1928 | France | 285/379 |
| 1533060 | 6/1968 | France | 285/197 |

*Primary Examiner*—Thomas F. Callaghan

[57] ABSTRACT

This relates to a mandrel clamp assembly for supporting a mandrel of a shirring machine and for introducing liquid and air into the mandrel. Most particularly, this relates to the mounting of a sealing sleeve and the mounting of a mandrel positioning pin.

11 Claims, 5 Drawing Figures

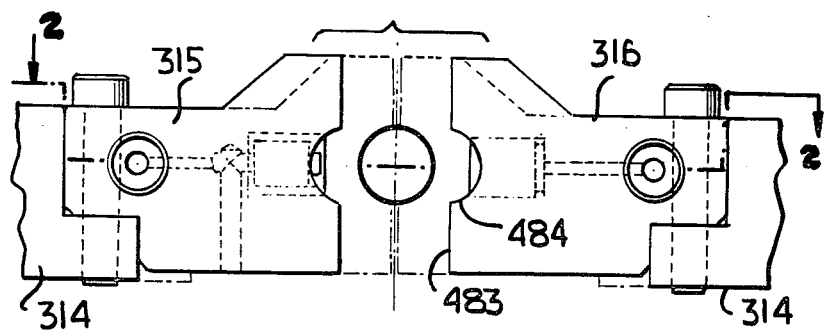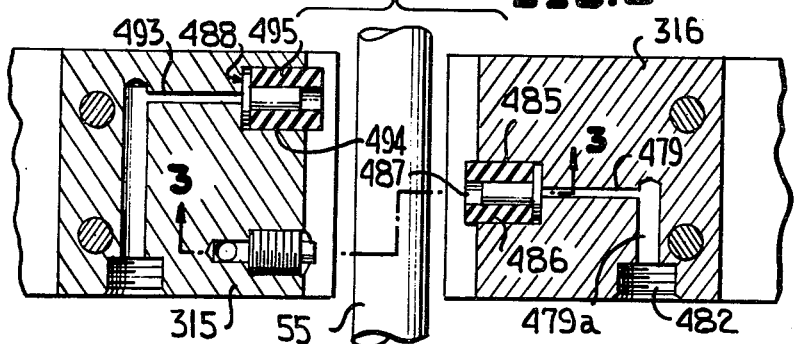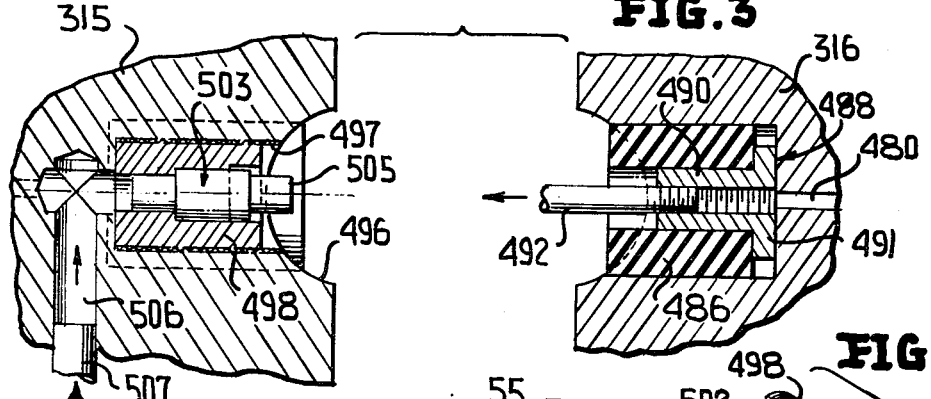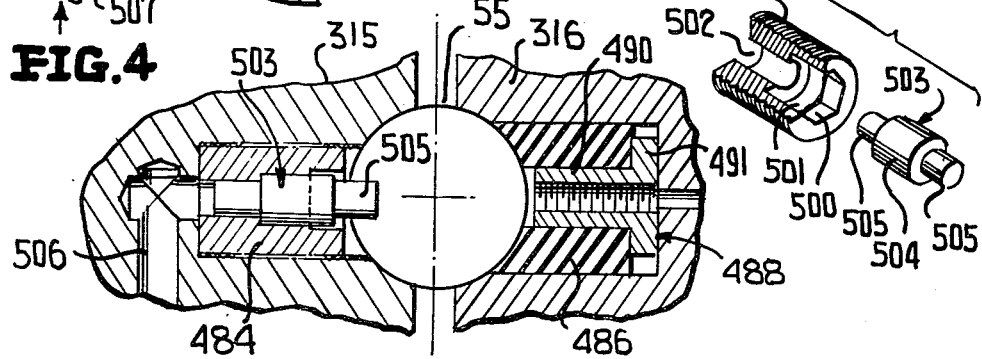

MANDREL CLAMP ASSEMBLY

This invention relates in general to new and useful improvements in mandrels for casing shirring machines, and more specifically to a novel mandrel clamp assembly.

In order effectively to shirr casing, it is desirable that the previously flat casing be inflated by the introduction of air under pressure, and also that it be internally lubricated or provided with a softening fluid. The clamps which support the mandrel are provided with fittings for introducing such air and liquid.

Further, mandrel clamps are provided with mandrel aligning pins which prevent rotation and axial movement of the clamped mandrel.

This invention particularly relates to the details of a sealing sleeve for forming a seal between the mandrel clamp and an air or liquid passage in the mandrel, and more particularly has to do with a device which will prevent the internal collapse of the sleeve and at the same time will permit ease of replacement of the sleeve.

Another feature of the invention is the mounting of the mandrel retaining pin in a manner wherein the pin is accurately positioned and may readily be replaced.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a schematic elevational view showing the details of a typical mandrel clamp assembly.

FIG. 2 is a horizontal sectional view taken generally along the line 2—2 of FIG. 1, and shows more particularly the details of the clamp assembly including means for introducing fluids into the mandrel and means for retaining the mandrel against both rotational and axial movement.

FIG. 3 is an enlarged fragmentary vertical sectional view taken generally along the line 3—3 of FIG. 2, and shows the specific details of the mounting of both a locating pin and a sealing unit and the means for effecting removal thereof, the mandrel being omitted for purposes of clarity.

FIG. 4 is a sectional view similar to FIG. 3 showing the mandrel in clamped sealed supported relation.

FIG. 5 is an exploded perspective view with parts broken away and shown in section showing the manner in which a retaining pin is carried by a supporting element.

Referring now to the drawings, it is to be understood that in a casing shirring machine a mandrel 55 for the casing is to be supplied air under pressure through spaced mandrel supporting clamps. Also, the mandrel is to be supplied a liquid which may be of a lubricating or softening nature for the casing being shirred. Finally, while the mandrel will be supported not only in the supporting clamps, but also by other portions of a casing shirring machine, there is a tendency first of all for the mandrel to rotate when the casing is spun and also to move axially. It is therefore necessary that the supporting clamps not only form seals with the mandrel, but also that the mandrel be mechanically interlocked with at least one of the supporting clamp assemblies. To this end, the clamps are of a special construction as will be apparent with reference to FIGS. 1-5. A typical clamp is illustrated and includes opposed cooperating halves 315 and 316 which are shown as being carried by slides 314.

The clamp half 316 is of the simplest construction and is provided only with means for forming a seal with the exterior of the mandrel 55 about an entrance port therein. For identification purposes only, it is to be understood that the clamp half 316 will supply air under pressure to the mandrel.

As is clearly shown in FIG. 2, the clamp half 316 is provided with an air supply passage 479 which has opening thereinto a further supply passage 479a which has an internally threaded outer portion 482 for receiving a tube ftting. It will also be seen from FIG. 1 that the clamp half 316 has a clamping face 483 with a part circular cross-sectional, longitudinally extending recess 484 therein. The supply passage 479 is directed toward the recess 484 and terminates in a large diameter bore 485 which opens through the clamp half 316 into the recess 484.

As is customary, a resilient sleeve 486 is positioned within the bore 485. However, in prior installations, when the projecting end of the sleeve 486 compressively engages the mandrel 55, there has been an inward deformation of the sleeve restricting the cross section of the bore 488 therethrough. Further, after the sleeve has been installed and operated for a period of time, the sleeve has a tendency to stick within the bore 485.

The deficiencies of the prior sleeve mountings has been cured in what is believed to be a very simple manner. A headed pin, generally identified by the numeral 488, is telescoped within the sleeve 486 from the inner end thereof, as is shown in FIG. 3. The pin 488 includes an internally threaded tubular portion 490 with a flat head 491. The bore of the tubular portion 490 extends through the flat head 491 and permits flow of the compressed air, or liquid as the case may be, from the supply passage 479 through the sleeve 496 in the conventional manner. However, when the clamp halves or jaws 315, 316 are tightly closed about the mandrel 55 and the outer end of the resilient sleeve 486 is compressed, the tubular portion 490 of the pin will prevent the customary internal collapse of the sleeve.

When it is desired to remove the sealing sleeve 486 and replace it with another, it is merely necessary to thread a removing tool 492 into the threaded bore of the tube portion 490 and then use the pin 488 to remove the resilient sleeve 486 as is schematically illustrated in FIG. 3.

Referring now to FIG. 2, it will be seen that the clamp half 315 also has a supply passage 493 corresponding to the supply passage 479 and that the passage 493 opens into a large diameter bore 494 having positioned therein a sealing sleeve 495 which is of the same construction as the sealing sleeve 486 and which is provided with a pin 488. The sealing sleeve 495 will supply the second of the fluids to the mandrel 55.

The clamp half 315 is also provided with the customary mandrel positioning pin which engages in a bore in the mandrel 55 to form an interlock therewith. However, in accordance with this invention, there is an improved pin arrangement which not only facilitates the accurate positioning of the pin but also ease of replacement.

First of all, there is formed in the clamping face of the clamp half 315 in alignment with a mandrel receiving recess 496 a relatively large diameter internally threaded bore 497. The bore 497 has threaded therein a member 498 which may well be a customary set screw. One end of the set screw is provided with a tool receiving socket 500 in the customary manner. The set screw 498 is provided with a bore 501 of a diameter generally corresponding to the distance between flats of the socket 500. This bore 501 extends only partially through the set screw and terminates in a reduced diameter bore 502 for receiving an end portion of the pin.

As is best shown in FIG. 5, the pin, which is identified by the numeral 503, preferably has a large diameter central portion 504 and two reduced diameter end portions 505. The diameter of the central portion 504 is such so as to provide a relatively tight fit within the bore 501 to assure proper positioning of the pin. The proportions of the pin 503 are such that the reduced diameter end portion 505 projects into the recess 496 the desired preselected amount. The opposite reduced diameter pin portion 505 is received in the bore 502 so that the pin 503 may be reversed when one end portion becomes damaged.

It will be readily apparent how the set screw or member 498 may be installed. It will also be readily apparent how the pin 503 may be installed. However, difficulties would normally be experienced in removing the pin. However, the bore 497 has a continuous bore or passage arrangement which opens through the exterior of the clamp half 315 in a passage 506 of a preselected conventional diameter. When it is desired to remove the pin 503, with reference to FIG. 4, the passage 506 is filled with a suitable fluid such as oil, and then a pin 507 is driven therein with the pin 507 functioning as a piston to pump the fluid through the passage 506 against the inner end of the pin 503 so as to expel the pin.

What is claimed as new is:

1. A sealing member for forming a seal with the exterior of a cylinder member around a radial bore therethrough, said sealing member comprising a sleeve of resiliently deformable material particularly adapted to be received in a bore in a support and having a seal forming end, and a collapse preventing member telescoped within said sleeve beginning at the end of said sleeve opposite from said seal forming end and terminating adjacent to but short of said seal forming end, said collapse preventing member having an axial flow bore extending entirely therethrough, and said axial flow bore having an internally threaded portion accessible to an externally threaded tool from said seal forming end for receiving such a threaded tool to facilitate removal of said sleeve from a support bore.

2. A tube retaining pin assembly comprising a holder, said holder being in the form of an externally threaded member having an outer end with tool engaging means, an axial bore in said threaded member of a preset depth, and a retaining pin of a preset length seated in said bore and projecting beyond said threaded member outer end for engagement in a radial bore in a tube.

3. An assembly according to claim 2 wherein said tool engaging means is in the form of an axial socket in said threaded member outer end, said socket being a polygonal cross section, and said bore cross section lies wholly within said socket cross section.

4. An assembly according to claim 2 wherein said retaining pin has a central portion of maximum section and two identical end portions of lesser section, said central portions being seated in said bore, and said threaded member having a smaller cross-sectional bore through an inner end thereof forming a continuation of said first mentioned bore.

5. An assembly according to claim 4 wherein said threaded member is threaded into an internally threaded bore in a tube support member, said tube support member having a clamping face with a part circular cross sectional tube seat therein, said threaded bore opening into said tube seat and said retaining pin projecting into said tube seat for engagement in a tube bore.

6. An assembly according to claim 5 wherein said threaded bore has a continuation bore opening through said tube support member remote from said tube seat, and said continuation bore has an outer terminal portion in the form of a pump cylinder for receiving a pump piston whereby said retaining pin may be removed from said threaded member by pumping hydraulic fluid through said continuation bore against the inner end of said retaining pin.

7. A tube support assembly comprising two opposed support members each having a clamping face with a part circular cross sectional groove therein defining a tube seat, at least one of said support members having a fluid passage extending therethrough and opening through a bore in said clamping face into said tube seat, a sealing member in said bore and projecting into said groove for sealing engagement about a fluid passage in a tube engaged by said support assembly, said sealing member being a sleeve of resiliently deformable material particularly adapted to be received in a bore in a support, and a collapse preventing member telescoped within said sleeve beginning at the end of said sleeve opposite from said seal forming end and terminating adjacent to but short of said seal forming end, said collapse preventing member having an axial flow bore extending entirely therethrough, and a tube positioning and aligning pin assembly carried by at least one of said support members and projecting into said tube seat forming groove for engagement in a positioning bore in a tube carried by said support assembly.

8. A tube support assembly according to claim 7 wherein said pin assembly includes a holder, said holder being in the form of an externally threaded member having an outer end with tool engaging means, an axial bore in said threaded member of a preset depth, and a retaining pin of a preset length seated in said bore and projecting beyond said threaded member outer end for engagement in a radial bore in a tube.

9. An assembly according to claim 8 wherein said tool engaging means is in the form of an axial socket in said threaded member outer end, said socket being a polygonal cross section, and said bore cross section lies wholly within said socket cross section.

10. An assembly according to claim 8 wherein said retaining pin has a central portion of maximum section and two identical end portions of lesser section, and said threaded member having a smaller cross sectional bore through an inner end thereof forming a continuation of said first mentioned bore.

11. An assembly according to claim 10 wherein said threaded member is threaded into an internally threaded bore in a tube support member, said tube support member having a clamping face with a part circular cross sectional tube seat therein, said threaded bore opening into said tube seat and said retaining pin projecting into said tube seat for engagement in a tube bore.

* * * * *